Dec. 24, 1940.                    I. B. COBB                      2,226,338
                              EDUCATIONAL DEVICE
                           Filed Sept. 15, 1939        2 Sheets-Sheet 1
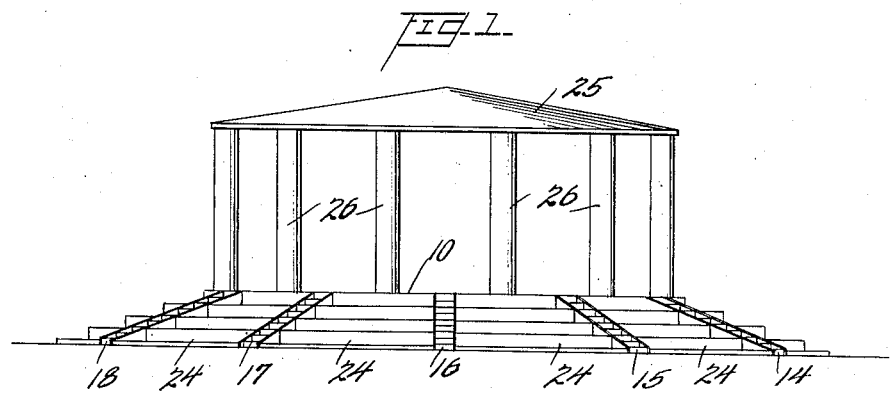
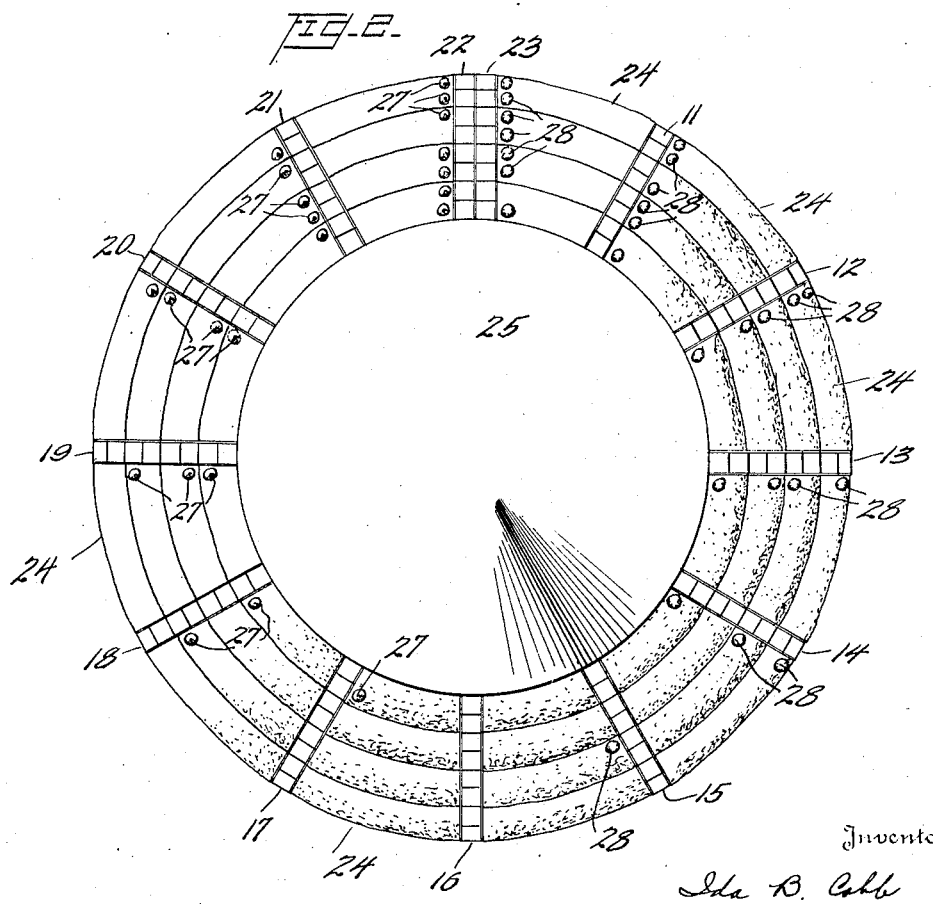

Dec. 24, 1940.   I. B. COBB   2,226,338
EDUCATIONAL DEVICE
Filed Sept. 15, 1939   2 Sheets-Sheet 2
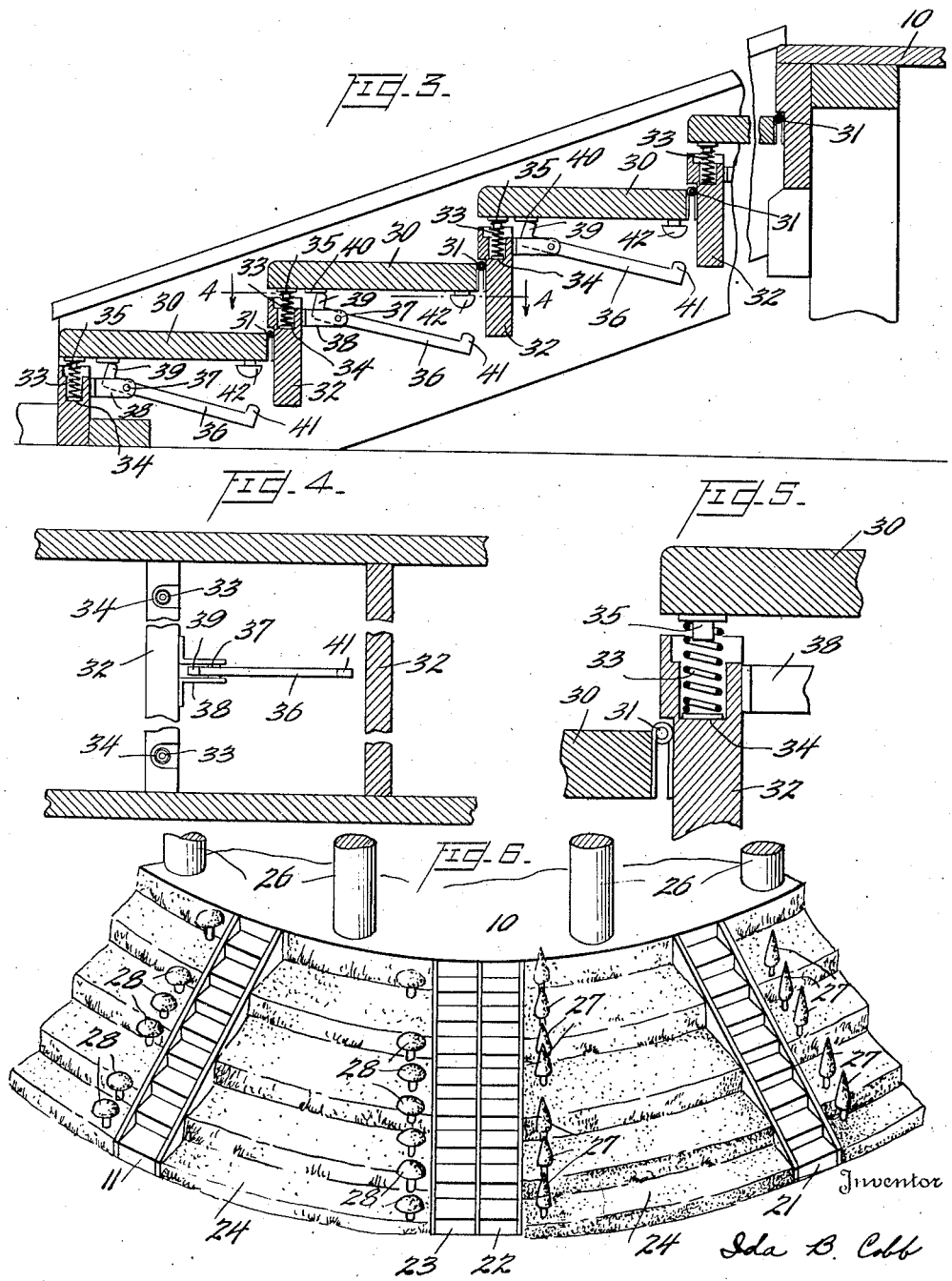

Patented Dec. 24, 1940

2,226,338

UNITED STATES PATENT OFFICE 2,226,338

EDUCATIONAL DEVICE

Ida Bostelmann Cobb, New York, N. Y.

Application September 15, 1939, Serial No. 295,130

8 Claims. (Cl. 84—477)

This invention relates to educational devices and more particularly to a device for use in connection with musical instruction. It has for its general object the provision of an improved device for demonstrating the harmonic relationships of the twelve major tones, including means for graphically representing the relation of the several keys, key signatures, and scales, as well as the relationship of the several tones in each scale.

The present invention is based upon the well known Pythagorean "cycle of fifths" which in turn is based upon the fact that if one sets down the representation of any given tone, and next to it the representation of its strongest overtone, which is the fifth, and continues this series, each tone being separated from the next by a musical interval of the value of a fifth, the series will eventually comprise the entire gamut of tones of the chromatic scale and will ultimately conclude with the same tone with which it was started. This "cycle of fifths" can be and has heretofore been represented by a series of points forming a circle, and this principle is employed in constructing and arranging the device of the present invention.

The invention comprises generally a plurality of radially disposed series of members, each series comprising eight members representing the tones of one of the twelve diatonic scales. The sequence of the several series is such that the basic tones of adjacent series or scales are separated by a musical interval of the value of a fifth, as in the "cycle of fifths." In the preferred form of the invention the several members of each series are provided with audible devices capable of sounding the respective tones represented by the said members, so that any given scale may be sounded by progressively striking the several members of the appropriate series. In this respect, the device may be considered as a musical instrument, since it is obvious that musical compositions may be played on it, although it is not particularly adapted to that purpose.

Also, in the preferred embodiment, the device of the present invention is provided with suitable indicia, disposed adjacent the appropriate members of the several series, for indicating sharps and flats, and with suitable indicia adjacent the outermost member of each series, which represents the basic tone or scale represented by said series, for identifying said scale. Other embellishments will occur to the skilled musician.

In view of the foregoing considerations, it is an object of the present invention to provide an improved musical instruction device comprising a plurality of series of depressible members, each member having an audible device associated therewith and adapted to give out a sound when the member is depressed, said several series representing the respective musical scales. It is a further object to provide a device such as that described, in which the several series of depressible members are arranged radially, to form a wheel-like structure, the basic tones of the scales represented by adjacent series being separated by a musical interval of the value of a fifth.

A further object is the provision, in a device of the kind in question, of novel indicia for indicating sharps and flats.

Other and further objects, features and advantages of the present invention will be apparent to one skilled in the art from the following description taken in connection with the accompanying drawings in which:

Figure 1 is a side elevation of a device constructed in accordance with the present invention;

Figure 2 is a plan view of the device of Figure 1;

Figure 3 is a vertical longitudinal section through one of the several series of depressible members comprised in the device of Figures 1 and 2;

Figure 4 is a horizontal section on line 4—4 of Figure 3;

Figure 5 is an enlarged detail of the mechanism of Figures 3 and 4; and

Figure 6 is a fragmentary perspective illustrating a portion of the device of Figures 1 and 2.

In order to facilitate an understanding of the invention, reference is made to the embodiment thereof shown in the accompanying drawings and detailed descriptive language is employed. It will nevertheless be understood that no limitation of the invention is thereby intended and that various changes and alterations are contemplated such as would ordinarily occur to one skilled in the art to which the invention relates.

Referring to Figures 1 and 2, the device of the present invention, in its preferred embodiment, comprises a circular central elevated platform 10 from which radiate thirteen radially disposed series or flights of steps, the respective series being designated by the numerals 11 to 23, inclusive. Series 11 to 21, inclusive, are spaced equally about the circle, series 22 and 23 being arranged side by side, equi-distant between series 21 and series 11. The spaces 24 between the respective series or flights of steps may be configured to represent terraces, and it will be seen that the whole device is arranged to represent a garden having a concert platform at the center, which is approached by a plurality of flights of steps. To this end, the structure may be provided with a roof portion 25, supported on columns 26. However, these latter embellishments obviously do not comprise an essential feature of the device. To enhance the garden-like aspect of the invention, the indicia indicating sharps and flats preferably take the form of sharp pointed and flat topped bushes or shrubs, as best seen in Figure 6, wherein the reference character 27 indicates the sharps and 28 the flats. Although there are only twelve series of tones comprising the diatonic scales in the system of Occidental music, since one of such scales may be and frequently is represented in two different manners, namely as the scale of F-sharp or the scale of G-flat, this series of tones is considered, in the present description, as constituting these two scales, and since the tones are the same in each scale, the series of steps or depressible members representing these scales are arranged side by side, being the series designated as 22 and 23. This arrangement is best seen in Figure 6. Each step of each series may be inscribed with the conventional representation of the corresponding tone of the musical scale. In addition, if desired, each series may be indicated, as a whole, by the conventional representation of the corresponding musical scale. However, it is obvious that each series or scale may be identified by the number and kind of indicia 27, 28 associated with it, as these differ in every case.

Referring now to Figures 3, 4 and 5, it will be seen that each series or flight of steps comprises a plurality of depressible members 30 constituting the treads of the steps, each member 30 being hinged, as at 31, to a riser 32. The outer edge of each tread 30 is supported upon helical springs 33 disposed in suitable recesses 34 formed in the upper edge of the corresponding riser 32, the upper end of each spring 33 seating on a stud 35, projecting from the bottom surface of the respective tread 30.

A hammer 36 is pivoted as at 37 to a bracket 38 projecting rearwardly from each riser 32, and is provided with an up-turned portion 39 adapted normally to rest in contact with a small wear plate 40 secured on the undersurface of the tread or depressible member 30. At its opposite end, each hammer 36 is provided with a second up-turned portion 41 which is adapted, when the member 30 is depressed, to be brought into engagement with a bell 42, the tone of which corresponds to the tone represented by the particular member 30. Thus, when any member 30 is depressed, the hammer 36 is caused to strike the associated bell 42, and the appropriate musical note is sounded. Obviously, the sounding of the musical notes corresponding to the several depressible members might be effected in any one of a number of different ways, such as by providing electrically operated bells or other audible devices, in combination with contact means for closing the electric circuit when the member 30 is depressed. The entire device of the present invention may be constructed on a small scale, so that the members 30 may be depressed by the fingers, or on a larger scale so that the members 30 may be depressed by stepping upon them. In the latter case, of course, the device will in effect comprise an actual garden, and the sharp and flat indicia 27 and 28 may comprise actual shrubs or evergreens.

If the device is made on a small scale, the members 30 may themselves be made of sound-producing material, in which case they may be manually struck with a small hammer or other instrument. In such case the members 30 need not, of course, be hinged, and the first described sounding mechanisms may be omitted.

Since the tones comprising the scales of G-flat and F-sharp are identical, the series 22 and 23 may comprise a single wide flight of steps or members 30, divided in the middle by a longitudinal mark of some suitable nature.

It will be apparent from the foregoing description that the device of the present invention provides an especially attractive and easily understood graphic demonstration of the relationship of the several tones in each diatonic scale and of the relationship of the several scales according to the "cycle of fifths." The usefulness of the device is enhanced by reason of the fact that it is adapted for playing games of various kinds, which games will have an amusement value as well as an educational value. Many such games will occur to the skilled musician or musical instructor.

It is obvious that it is not essential to the invention that the depressible members 30 be arranged at different levels, and the device might be constructed all on the same level, the depressible members 30 taking the form of stepping-stones in a path. Other modifications will readily occur to those skilled in the art to which the present invention relates.

Having thus described the invention, what is claimed as new and desired to be secured by Letters Patent is:

1. An educational device comprising a unitary generally circular structure including a plurality of radially disposed series of depressible members, each series representing a different one of the diatonic scales and consisting of eight depressible members representing the eight tones of the respective scale, each said depressible member having associated therewith a sounding device for sounding the represented tone when said member is depressed, and means adjacent each said series for identifying the diatonic scale represented by said series.

2. An educational device comprising a unitary generally circular structure including a plurality of radially disposed series of depressible members, each series representing a different one of the diatonic scales and consisting of eight depressible members representing the eight tones of the respective scale, the basic tones of adjacent series being separated by a musical interval of the value of a fifth, two series representing the G-flat and F-sharp scales being arranged side by side, each said depressible member having associated therewith a sounding device for sounding the represented tone when said member is depressed, and means adjacent each said series for identifying the diatonic scale represented by said series.

3. An educational device comprising a unitary generally circular structure including a plurality of radially disposed series of depressible members, each series representing a different one of the diatonic scales and consisting of eight depressible members representing the eight tones of the respective scale, each said depressible member having spring means for normally maintaining said member in raised position, a hammer associated with said member and adapted to be actuated when said member is depressed, and a sound-producing element adapted to be struck by said hammer when said member is depressed, and means adjacent each said series for identifying the diatonic scale represented by said series.

4. An educational device comprising a unitary generally circular structure including a plurality of radially disposed series of depressible members, each series representing a different one of the diatonic scales and consisting of eight depressible members representing the eight tones of the respective scale, the basic tones of adjacent series being separated by a musical interval of the value of a fifth, two series representing the G-flat and F-sharp scales being arranged side by side, each said depressible member having spring means for normally maintaining said member in raised position, a hammer associated with said member and adapted to be actuated when said member is depressed, and a sound-producing element adapted to be struck by said hammer when said member is depressed, and means adjacent each said series for identifying the diatonic scale represented by said series.

5. An educational device comprising a unitary generally circular structure including a plurality of radially disposed series of depressible members, each series representing a different one of the diatonic scales and consisting of eight depressible members representing the eight tones of the respective scale, each said depressible member having associated therewith an audible device for sounding the represented tone when said member is depressed, each said series of depressible members being arranged as a flight of steps leading up to a common central platform, and means adjacent each said series for identifying the diatonic scale represented by said series.

6. An educational device comprising a unitary generally circular structure including a plurality of radially disposed series of depressible members, each series representing a different one of the diatonic scales and consisting of eight depressible members representing the eight tones of the respective scale, each said depressible member having associated therewith an audible device for sounding the represented tone when said member is depressed, and means disposed adjacent the appropriate members for indicating those members which represent sharps and flats in the musical scale, said last means also serving to identify the diatonic scale represented by each said series.

7. An educational device comprising a unitary generally circular structure including a plurality of radially disposed series of sound-producing members, each series representing a different one of the diatonic scales and consisting of eight members representing the eight tones of the respective scale, each said member being adapted when struck to sound the represented tone, and means adjacent each said series for identifying the diatonic scale represented by said series.

8. An educational device comprising a unitary generally circular structure including a plurality of radially disposed series of depressible members, each series representing a different one of the diatonic scales and consisting of eight depressible members representing the eight tones of the respective scale, each said depressible member having associated therewith an audible device for sounding the represented tone when said member is depressed, and means disposed adjacent the appropriate members for indicating those members which represent sharps and flats in the musical scale, said last means comprising sharp-pointed and relatively flat-topped members, respectively.

IDA BOSTELMANN COBB.